United States Patent [19]
Barnhart et al.

[11] 3,762,582
[45] Oct. 2, 1973

[54] TRANSFER AND ACCUMULATING APPARATUS

[75] Inventors: Robert E. Barnhart; Henry L. Doerger, both of Cincinnati, Ohio

[73] Assignee: The Proctor & Gamble Company, Cincinnati, Ohio

[22] Filed: June 6, 1972

[21] Appl. No.: 260,231

[52] U.S. Cl. ............................. 214/16.4 R, 198/20
[51] Int. Cl. ............................................. B65g 1/06
[58] Field of Search ................ 214/16.4 R, 16.1 BA, 214/16.1 BB; 198/20

[56] References Cited
UNITED STATES PATENTS
| | | | |
|---|---|---|---|
| 2,014,458 | 9/1935 | Winkley | 198/19 |
| 2,703,643 | 3/1955 | Parson | 198/137 |
| 3,499,555 | 3/1970 | Wahle | 214/16.4 R |

FOREIGN PATENTS OR APPLICATIONS
1,342,709  8/1963  France........................ 214/16.1 BA Primary Examiner—Drayton E. Hoffman
Assistant Examiner—R. B. Johnson
Attorney—Richard C. Witte et al.

[57] ABSTRACT

A transfer and accumulating apparatus is provided wherein trays, which are typically part of a ferris-wheel type storage/accumulation apparatus, are also used as a major part of the transfer apparatus. A pusher such as a powered chain with pusher dogs thereon is used to push the articles to be transferred (and stored) onto and across the trays. The apparatus is particularly well adapted to handle logs (i.e., long rolls) of rewound paper since there is no rolling movement and the attendant unwinding of the "logs".

8 Claims, 6 Drawing Figures

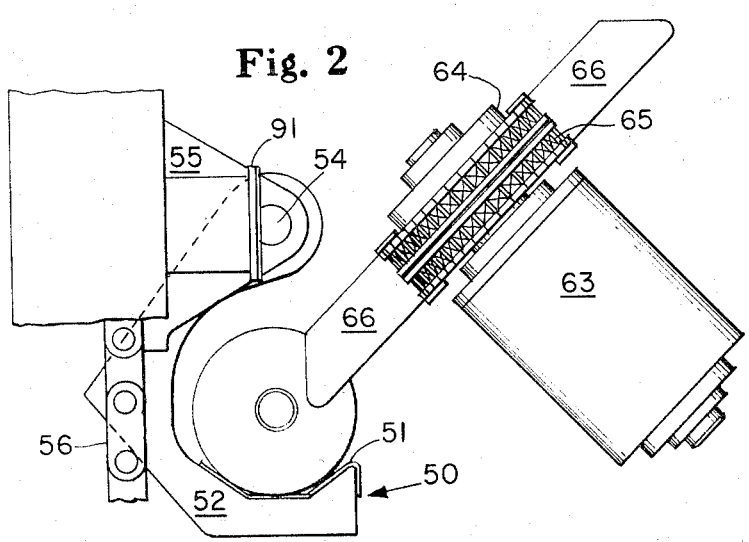
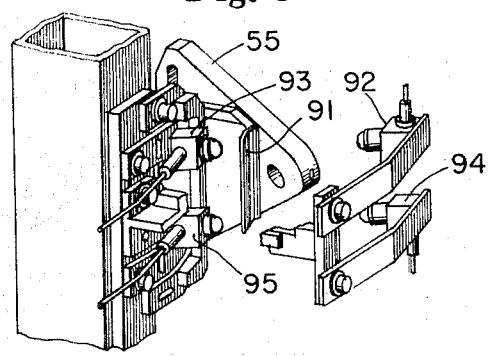
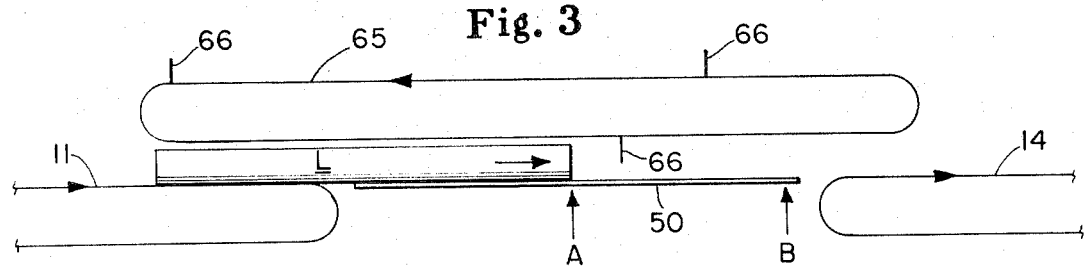
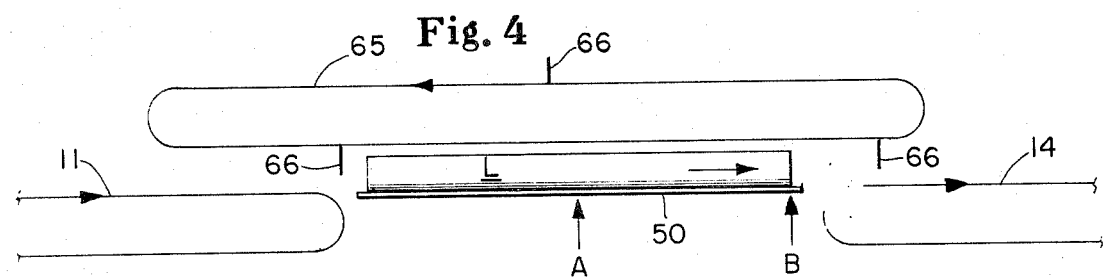

TRANSFER AND ACCUMULATING APPARATUS

BACKGROUND OF THE INVENTION

This invention relates to apparatus for transfer and accumulation of articles, and more particularly to such an apparatus wherein articles are both transported along and, when desired, stored on trays on a conveyor and especially of a ferris wheel type conveyor.

Often it is desirable to provide temporary storage, commonly referred to as accumulation or surge, of articles which are in process in a production facility. Typical of the reasons for providing such accumulation is the desire to avoid shutting an entire production line down upon the malfunction of any of the many individual machines which comprise such a line. For instance, if a first machine fills containers and a second machine applies closures thereto, it is often desirable to provide an accumulating device between the two machines. Such a device can accept and store filled containers from the first machine in the event the second machine is stopped for any reason. Similarly, any stored containers can be fed to the second machine when the first is stopped for any reason.

With no surge between the processing steps on a production line, the efficiency of the line is simply the product of the efficiency of the individual processing steps. In the filling and closing example, if each machine were 50 percent (50/100 or 0.5) efficient the line would be 25 percent (0.5 × 0.5 = 0.25) efficient. The provision of unlimited and perfectly efficient accumulation of articles between each processing step increases the efficiency of the line to equal that of the least efficient processing step in the line. In the example the use of a perfect accumulator would increase the production line efficiency from 25 percent to 50 percent which would allow the line to produce twice as much in a given period of time. This dramatically demonstrates the value of efficient surge devices.

Accordingly, a large number of accumulator designs have been developed in the past and satisfactory devices are now available to provide surge with a wide variety of articles. A particularly satisfactory concept for temporary storage of articles is a ferris wheel arrangement or a modification thereof. Most broadly, a ferris wheel storage apparatus is one in which receivers for articles (e.g., trays) are disposed in an endless configuration, for instance like the seats on a ferris wheel. Such accumulators are broadly shown in U.S. Pat. No. 2,014,458 which issued Sept. 17, 1935 to E. E. Winkley; U.S. Pat. No. 2,703,643 which issued Mar. 8, 1955 to C.W.S. Parsons; and U.S. Pat. No. 3,499,555 which issued Mar. 10, 1970 to G. Wahle.

While providing satisfactory storage for many types of articles the loading means provided in the apparatus of these patents is ill suited to some types of articles. The Winkley device requires that articles to be stored be put in special containers which are adapted to engage brackets on the storage apparatus. The Parsons apparatus is loaded by hand. Loading of the Wahle accumulator is accomplished by a lateral pushing of articles from a conveyor which parallels the accumulator and unloading is accomplished by a member which grips the articles by a suction device and returns them to the aforementioned conveyor. Thus, these and other accumulating devices are not readily adaptable to articles which cannot conveniently be put in special containers and which are unsuited for movement by lateral pushing and suction withdrawal.

Although the apparatus described hereinafter can be used to advantage with many types of articles which are difficult or impossible to handle on prior art devices, it will be described in connection with only one of such articles; viz., logs of rewound paper. Those skilled in the art will appreciate from the following description the utility of the present invention with many other articles.

Paper is made on a continuous basis and webs of finished paper are wound on large rolls generally referred to as parent rolls. In making toilet tissue, the paper from parent rolls is perforated and then rewound on an apparatus known as a rewinder onto cylindrical paper cores whose length equals the width of the paper on the parent roll, typically several feet. A core wrapped with tissue to an outside diameter of typically 5 or 6 inches is called a "log." Logs of tissue are then cut on a "slitter" to form the typical rolls of toilet tissue. Both the rewinding and slitting oeprations have significant inefficiencies associated therewith and consequently an accumulation device between them is desirable.

Logs of paper are not amenable to many kinds of handling without causing special problems. In particular, rolling of a log of paper is undesirable as the paper unwinds therefrom. If rolled back to its original position, there is an undesirable tendency for the free edge of the sheet to fold and wrinkle. Lateral sliding movement is just as undesirable in this regard and suction pulling of an article with a porous non-planar surface is difficult or impossible.

Accordingly, it is an object of the present invention to provide an improved accumulator particularly adapted to accommodate articles heretofore difficult to handle.

It is another object of this invention to provide such an accumulator of the ferris-wheel type.

It is a further object of this invention to provide such an accumulator which is simple and therefore reliable.

SUMMARY OF THE INVENTION

These and other objects are provided by an improved accumulator wherein trays adapted to receive and hold the articles to be accumulated are axially aligned with the conveyor feeding articles to the accumulator when they are to receive an article. A pusher transfers articles from the infeed conveyor onto the trays of the accumulator. If the articles on the tray are not to be stored, the pusher travel continues and the articles are, in effect, simply passed through the accumulator. The trays in the accumulator serve, in conjunction with the pusher mechanism, as conveyors and, if articles are to be stored, the pusher travel stops at a point such that the articles remain on a tray which is then indexed by an indexing means, and movable support means to put the articles in a storage position. The indexing also moves an empty tray into position to accept subsequent articles. When stored articles are to be removed, the trays are indexed to the unloading station. The pusher then displaces the previously stored articles from the trays.

BRIEF DESCRIPTION OF THE DRAWINGS

Although the specification concludes with claims particularly pointing out and distinctly claiming the subject matter regarded as forming the present inven

FIG. 2 is a detailed elevational view of the accumulator tray and pusher arrangement as viewed along line 2—2 in FIG. 1;

FIGS. 3 and 4 are schematic elevational views illustrating the operating sequence of the apparatus of FIG. 1;

FIG. 5 is a detailed perspective view of the indexing sensing devices used in the apparatus of FIG. 1.

DESCRIPTION OF THE PREFERRED EMBODIMENTS

Figure 1:
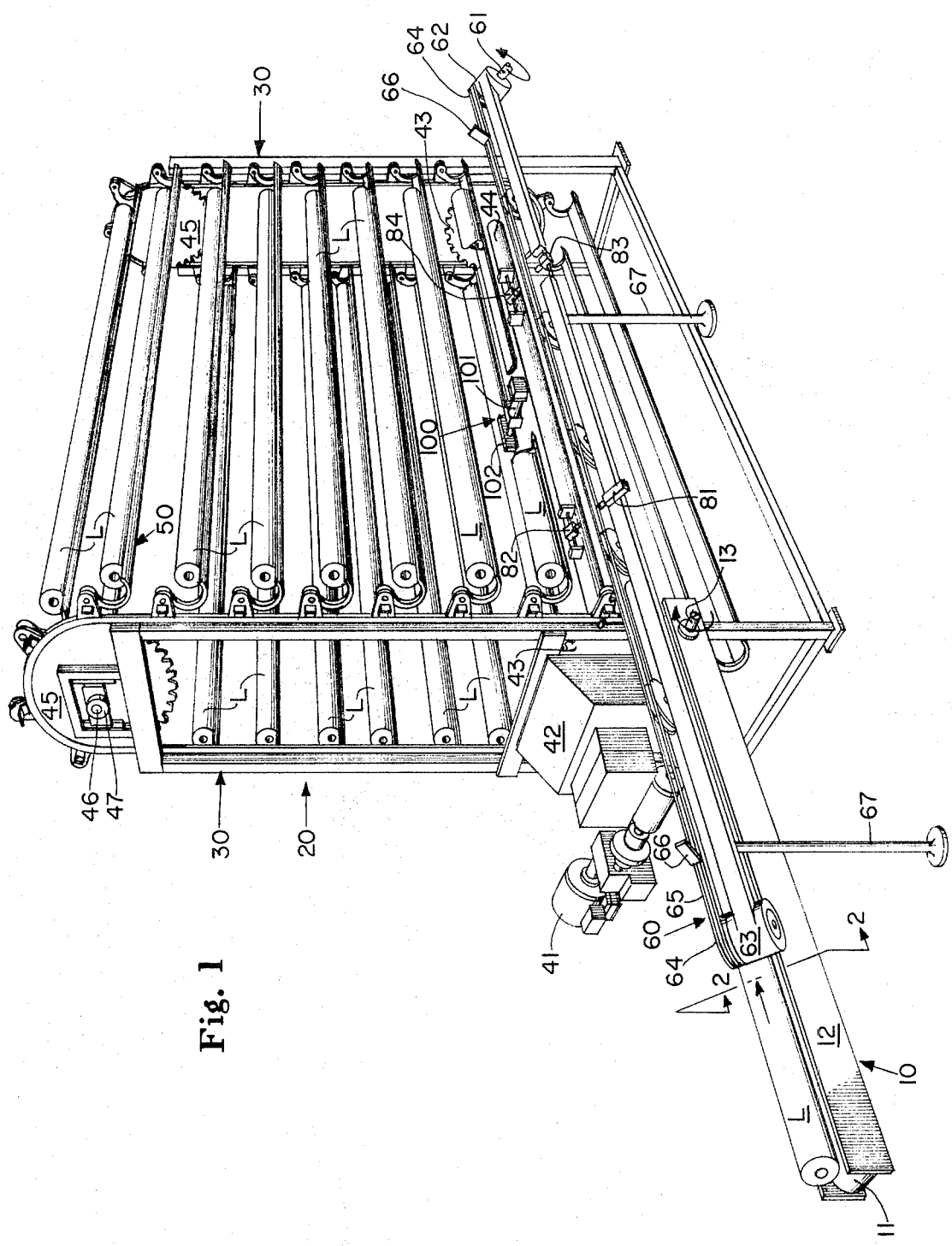
- FIG. 1 is a perspective view of a preferred embodiment of the present invention.

Turning now to the drawings, FIG. 1 illustrates the best mode contemplated for practicing the present invention. An infeed conveyor 10 transfers logs L from the prior processing station to the accumulator 20. Although many types of conveyors can be used, a particularly satisfactory one for use in connection with logs of rewound paper is comprised of a belt 11, frame 12 and suitable support and drive rolls (not shown) as are well known in the materials handling art. Any suitable drive means is connected to the drive shaft 13 and when conveying logs of paper will typically drive the belt 11 at about 150 feet per minute. The belt 11 preferably is sufficiently smooth in order to allow at least limited relative motion; i.e., slippage, between the belt 11 and the logs L being transferred without damage to said log L as will be described more fully hereinafter. Alternatively, the belt 11 can be stopped and started in such a way as to substantially avoid such relative motion by a variety of control systems as will be apparent to those skilled in the art from the following description.

The transfer and accumulating apparatus is generally designated by the numeral 20 and includes a plurality of trays, designated generally by the numeral 50, which are shown in more detail in FIG. 2. In accordance with the broadest aspects of the present invention the trays 50 are, when stationary, disposed such that one of them is at a loading position in axial alignment with the infeed conveyor 10. Articles on the conveyor 10 are fed onto the trays 50 by the action of said conveyor and/or an additional pushing means. The trays 50 are attached to one or more movable support members. An indexing means is provided and, when storage of articles on said trays is desired, said movable members are moved so as to index a loaded tray from said loading station into storage and simultaneously index another tray into said loading station. Trays which are to be unloaded are indexed to an unloading station which is typically, but not necessarily, at the same location as the loading station. If the trays are unloaded at the same location at which they are loaded, the loading pusher preferably also serves as an unloading pusher, although this function can also be served by a separate pusher. Of course, a separate unloading pusher is required if unloading is accomplished at a different location than loading.

The embodiment of the present invention shown in FIG. 1 is particularly adapted to accept logs into and discharge logs from the tray 50 which is in axial alignment with the infeed conveyor 10. If a log is to be accumulated, the tray carrying such a log is indexed upwardly, and logs are returned to the discharge position by indexing the trays carrying them downwardly (both upwardly and downwardly indexing being as seen at the front of the apparatus, i.e., as in FIG. 1).

Further relating the broad description of the present invention to the embodiment illustrated, the pushing means comprises a pusher which is designated generally by the numeral 60 and adapted to push logs from the infeed conveyor 10 onto the tray 50 at the loading station. In the embodiment illustrated, discharging is accomplished at the same position as loading and the pusher 60 also serves to push logs onto a discharge conveyor (not shown) which is in axial alignment with the discharge station and which will typically be similar in design to the infeed conveyor 10.

It should be noted that logs which do not need to be stored are simply pushed along the tray located at the loading and discharging station. Thus the accumulator itself, and more particularly the tray 50 located at the loading and discharge station, serves as part of a simple conveying means between the infeed conveyor 10 and the discharge conveyor when accumulation is not desired.

The pusher 60 rests on support by members 67 and includes a drive means (not shown) driving the drive shaft 61. A head pulley 62 and a tail pulley 63 designed in accordance with conventional practices known in the art support sprockets 64 which carry the chain 65. On the chain 65 are a number of dogs 66 which are adapted to abut the trailing edge of the logs (the left end as shown in FIGS. 1, 3 and 4) and push them from the infeed conveyor 10 to the tray 50 at the loading station and from such a tray to the discharge conveyor (not shown). As mentioned in connection with the belt 11, the pusher 60 is preferably driven at approximately the same speed as the infeed and discharge conveyors, thereby minimizing the relative motion between these conveyors and a log L, and the attendant scuffing of the log L, during the transfer of the logs L to and from the trays 50.

FIG. 2 shows the relationship of the pusher 60 to a log L in more detail and also shows a preferred embodiment of the tray 50. Each tray 50 is attached to at least one movable support member and the nature of the support member and its disposition largely determine the appearance of the transfer and accumulating apparatus. For instance, the trays can be disposed on a horizontal rigid support member and be indexed laterally to store articles, resulting in a flat table-like accumulator. While this and other configurations are possible, for reasons of conservation of space, it is typically desirable to dispose the trays in a substantially vertical arrangement.

The preferred vertical arrangement for many applications is the elongated ferris wheel type shown in FIGS. 1 and 2. Referring to FIG. 2, the tray 50 includes a smooth plate 51 which is contoured to suit the articles being conveyed and can include vertically disposed guides to constrain undesired lateral movement of articles. The tray 50 and more particularly the plate 51 by virtue of such construction is adapted to accept articles which are slid onto it by the combined action of the belt 11 and pusher 60. The plate 51 rests at either end on a support 52 and is attached thereto. Although the plate 51 or the support 52 can be attached directly to the endless flexible supports, chains 56, (which are disposed one near either end of the plate 51 and serve as the movable support members) the attachment is preferably a pivotal one for use with the ferris wheel type of accumulator illustrated. This construction, of course, allows the trays 50 to remain horizontal as they are being carried around the ferris wheel and through the turns at the top and bottom thereof. The pivotal connection is accomplished via pin 54 which pivotally connects support 52 and the bracket 55. The bracket 55 is, in turn, connected to the chain 56.

Returning now to FIG. 1, the indexing means for moving the chains 56, and consequently the trays 50 includes as a drive means motor 41 and a multistage speed reducer, designated generally by the numeral 42, having an output speed of about 4 R.P.M. The indexing means is preferably reversable thereby allowing trays 50 to be indexed upwardly into storage and downwardly therefrom. The drive means drives two lower sprockets 43 (the left hand one of which is substantially obscured by the speed reducer 42) connected by the shaft 44. For cleanliness and safety, chains 56 are preferably carried within the frame 30 of the accumulator and connect the lower sprockets 43 with their respective upper sprockets 45 which are supported on their shafts 46 by suitable bearings 47.

After the pusher 60 has loaded a log L onto the tray 50, as will hereinafter be described, and if such a log L is to be stored, the tray is indexed upwardly into storage and an empty tray is simultaneously indexed into the loading station. Similarly, when the logs L are to be returned from storage the trays are indexed downwardly. Because of the substantial inertia of the accumulator and the importance of achieving accurate positioning of trays 50 at the feeding and discharge station, special precautions will typically be necessary in designing the indexing control for the chains 56 and trays 50. As shown in FIG. 5, a flag 91 is provided on each of the tray brackets 55 at one end of the accumulator. An upper photocell 92 and its light source 93 are used to provide the stop signal when indexing the trays downwardly. Responsive to the leading (lower) end of the flag 91 the photocell 92 will stop the motor 41 and the inertia of the system carries the trays 50 downwardly a small additional amount to provide the desired alignment of the tray 50 and conveyor 10. Similarly the lower photocell 94 and its light source 95 are used to provide the stop signal when indexing the trays upwardly. Responsive to the leading (upper) end of the flag 91 the photocell 94 will stop the motor 41 and the inertia of the system carries the trays 50 upwardly a small additional amount, again resulting in a tray 50 stopping in the desired position aligned with the infeed and outfeed conveyors. Many other means can be used to effect the desired alignment and with many variations of the present invention there is no need for separate sensing and/or control elements for indexing in the two directions.

The operating sequence of the transfer and accumulating apparatus of the present invention can best be described with reference to the pusher 60 and the illustrations of FIGS. 3 and 4. Preferably, there will be three dogs 66 disposed equal distances apart on the chain 65 of the pusher 60 as shown. In the schematic representation of FIG. 3 the chain 65 and dogs 66 are shown in the desired position to receive a log L. When the leading end of the log L advances under the action of the conveyor 10 to the point A along the tray 50, its position is sensed by a photoelectric switch (81 in FIG. 1) and its associated light source (82) or any of the other sensors well known in the art and the pusher drive is started. The log L is pushed onto the tray 50 by the combined action of the conveyor 10 and pusher 60 and the pusher drive is stopped so as to stop the dog 66 being used just short of the tray 50 as shown in FIG. 4. Stopping of the pusher 60 may be accomplished by a variety of conventional control means, for instance, by sensing the position of any of the dogs 66 with a limit switch. With conveying speeds on the order of 150 feet per minute, the inertia of the log L is sufficient to carry it about two inches beyond the dog 66 which pushed it. In this way, the log can come to rest completely on the tray 50 although the dogs 66 which pushed it is stopped clear of the tray. The spacing between the dogs 66 is preferably somewhat greater than the length of the tray 50, allowing adjacent dogs 66 to straddle the tray 50. This allows the plate 51 to be indexed upwardly into storage without interference from the dogs 66. One alternative, although generally less desirable, arrangement to avoid this interference would be to provide clearance slots in the tray to allow the dogs 66 to pass "through" the tray. Many other modifications of the pusher 60 to accomplish the same ends will also occur to those skilled in the art. The chain 65 and dogs 66 will also be stopped in the position shown in FIG. 4 at such time as it is desired to index a log L back from storage and push it onto the discharge conveyor 14.

Figure 6:
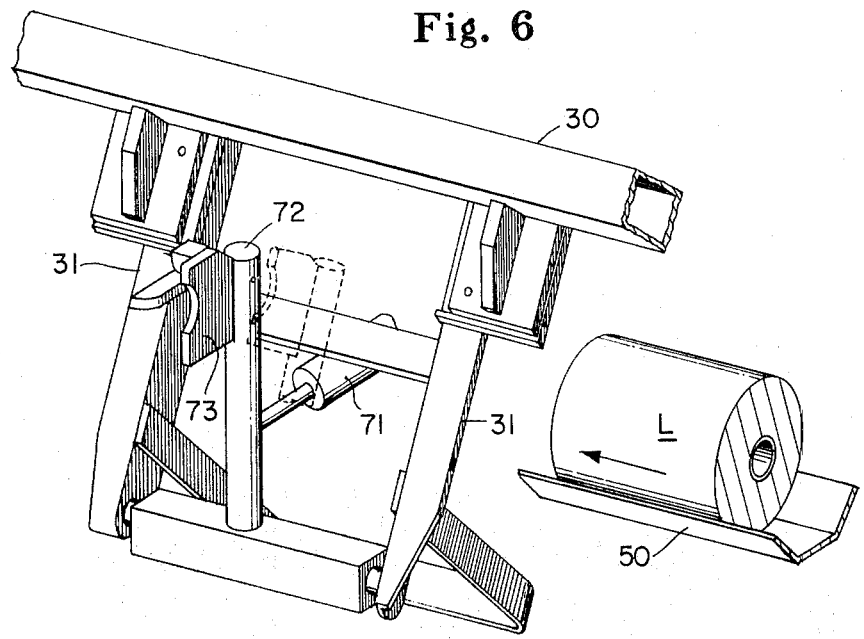
FIG. 6 is a detailed perspective of the log stop of the apparatus of FIG. 1.

Preferably, a movable stop (as shown in FIG. 6 and designated generally by the numeral 70) will be provided at the position designated B on FIGS. 3 and 4. The stop will typically be moved by an air cylinder 71 and triggered, for instance, by sensing the leading edge of a log L with a photoelectric sensor 83 and its associated light source 84 (both of which are shown in FIG. 1). An arm 72 is pivotally attached to the machine frame 30 via a bracket 31. Actuation of the air cylinder 71 moves the arm 72 and plate 73 into the position shown in FIG. 6 thereby prohibiting passage of the log L. Deactivation of the air cylinder 71 allows the arm 71 and plate 72 to withdraw to the position indicated by the dashed lines, thereby allowing logs L to pass. Such a stop serves to prevent inertial overtravel of the log L along the tray 50. If location of logs L on the trays 50 is not critical, such a stop can be eliminated.

If logs L are supplied to the transfer and accumulating apparatus for an extended period of time and no logs L are removed during such time, the capacity of the accumulator may be reached. If desired, a kick-off device designated generally by the numeral 100 in FIG. 1 can be provided to eject excess accumulated logs onto a table or the like and thereby avoid having a tray 50 with a log L in place being indexed into the loading station to accept an additional log L and thereby jam the apparatus. Such a device will typically comprise an air cylinder 101 connected to any suitable air source and a log contacting member 102 attached to the piston of the cylinder. Alternatively, a photocell or the like (not shown) can be used to sense the presence of a log L on the tray 50 adjacent the loading station and, if a log is present, provide a signal which will prohibit indexing of the full tray 50 to the loading station to accept an additional log.

A broad range of specific control schemes can be used to provide the requisite timing of the various elements of the accumulator and such schemes need not be described in detail to allow those skilled in the art to make and use the present invention.

Many modifications of the invention can be made and it is not intended to limit the invention to the particular structures described, all reasonable equivalents thereof being intended to fall within the scope of this invention.

What is claimed is:

1. In an apparatus for the transfer and temporary storage of articles comprising a plurality of trays, each of said trays being affixed to at least one movable supporting means, each of said trays being adapted to receive and hold at least one of said articles, and a means for indexing one of said trays from a first location at which location said articles are placed on said trays to a second location at which location said articles are stored and simultaneously indexing another of said trays to said first location, said indexing means also being adapted to deliver trays of articles from said second location to a location for emptying said trays, the improvement wherein said articles are delivered to said first location by a first conveying means axially aligned with the tray at said first location and transported from the tray at said second position by a second conveyor, said second conveyor being in axial alignment with said second position, and wherein transfer from said first conveyor to the tray at said first position and from the tray at said second location is accomplished by a pusher means adapted to axially push said articles.

2. The apparatus of claim 1 wherein said location at which trays are loaded and said location at which trays are unloaded are the same.

3. The apparatus of claim 2 wherein a single pushing means serves both to slide articles onto and from the tray at said loading and unloading location.

4. The apparatus of claim 1 wherein said movable supporting means comprises two chains, each engaging an upper and a lower sprocket and being driven by one of said sprockets.

5. The apparatus of claim 4 wherein said trays are pivotally connected to said chains.

6. The apparatus of claim 1 including a movable stop adapted to limit the travel of said articles along said trays upon the loading thereof.

7. In an apparatus for the transfer and temporary storage of articles comprising a plurality of trays, each end of each of said trays being affixed to a respective one of two endless flexible supports, each of said trays being adapted to receive and hold at least one of said articles, and a means for indexing one of said trays from a loading and unloading position into a storage position and simultaneously indexing another of said trays to said loading and unloading position, said indexing means also being adapted to deliver trays from storage into said loading and unloading position, the improvement wherein said articles are delivered to the tray at said loading and unloading position by a first conveying means axially aligned with said position and transported from the tray at said position to a second conveying means axially aligned with said position and wherein transfer between said tray at said loading and unloading position and said first and second conveying means by a single pushing means adapted to axially push said articles.

8. The apparatus of claim 7 including a movable stop adapted to limit the travel of said articles along said trays upon the loading thereof.

* * * * *